Figure 6:
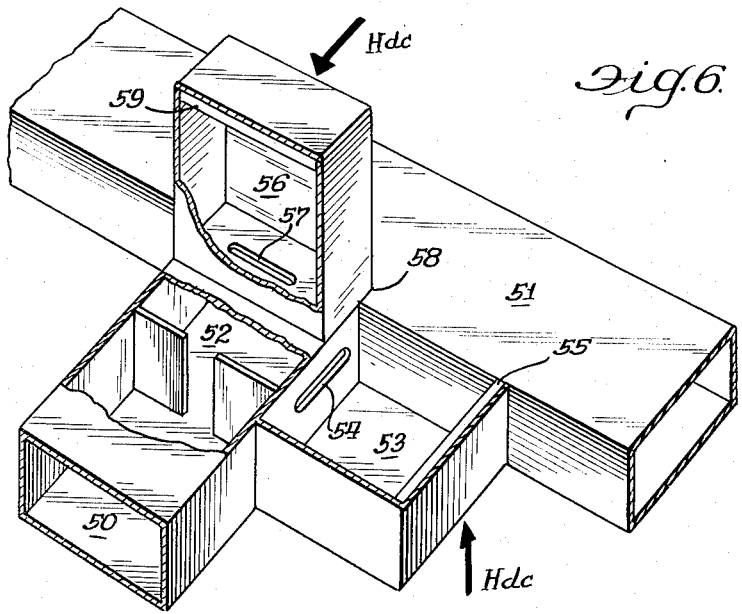

Nov. 2, 1965  C. B. THOMAS ETAL  3,215,955
WAVEGUIDE SWITCHING BY VARIABLE TUNING OF A CAVITY
WHICH SHUNTS A BAND-PASS FILTER
Original Filed July 2, 1962  3 Sheets-Sheet 1
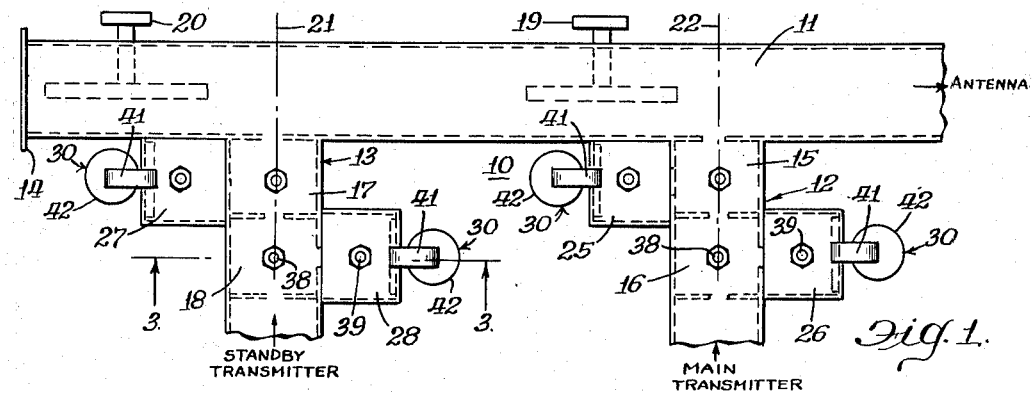
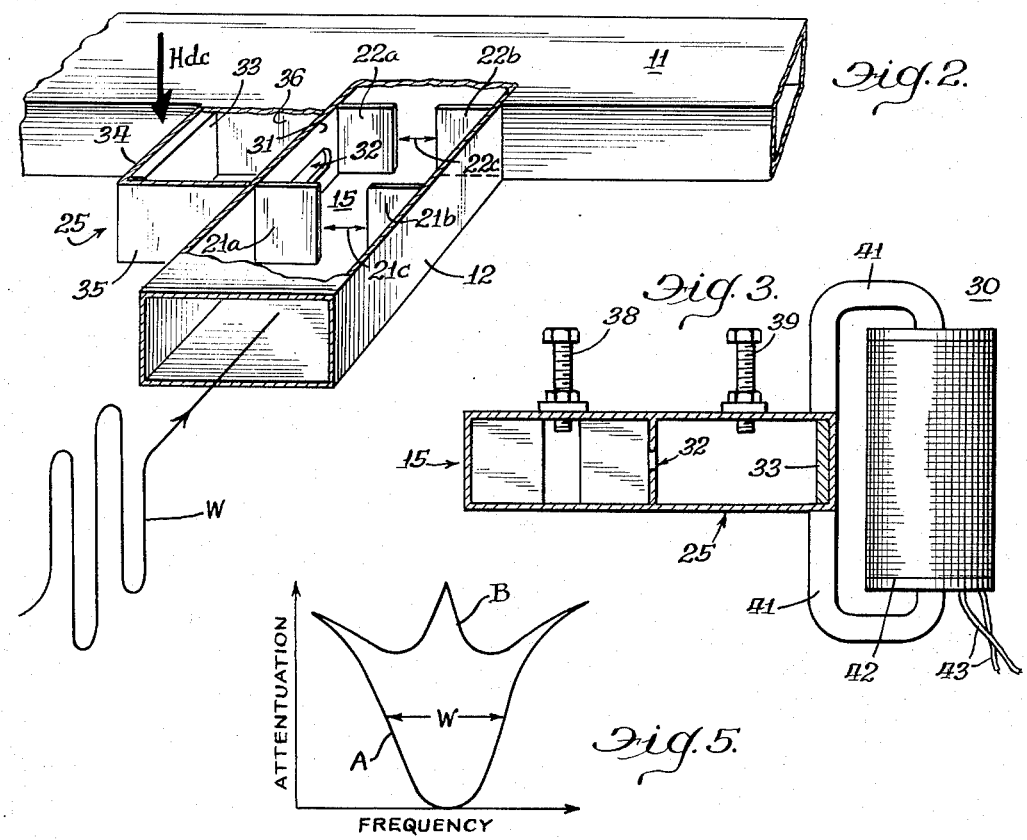
INVENTORS.
Clifford B. Thomas
Herbert W. Iver
By Mueller and Aichele
Attys.

INVENTORS.
Clifford B. Thomas
Herbert W. Iwer
By Mueller and Aichele
Attys

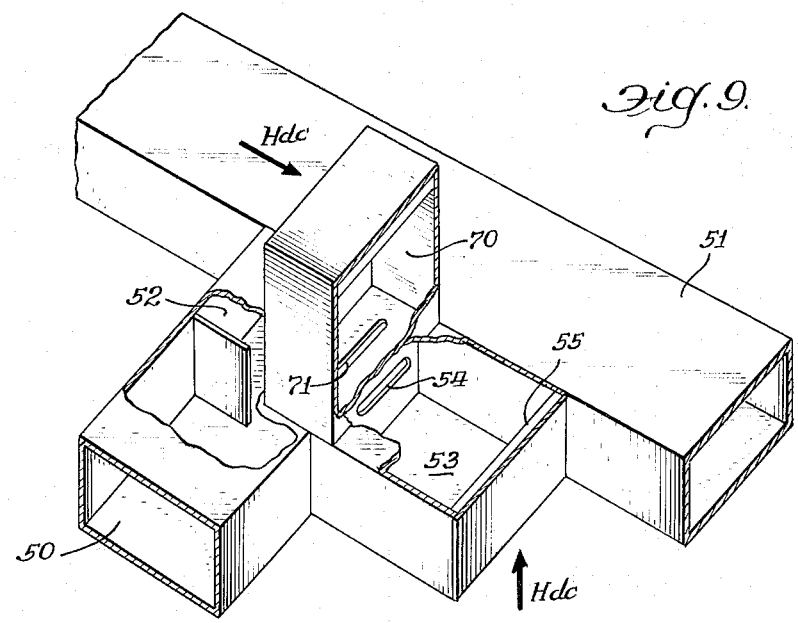
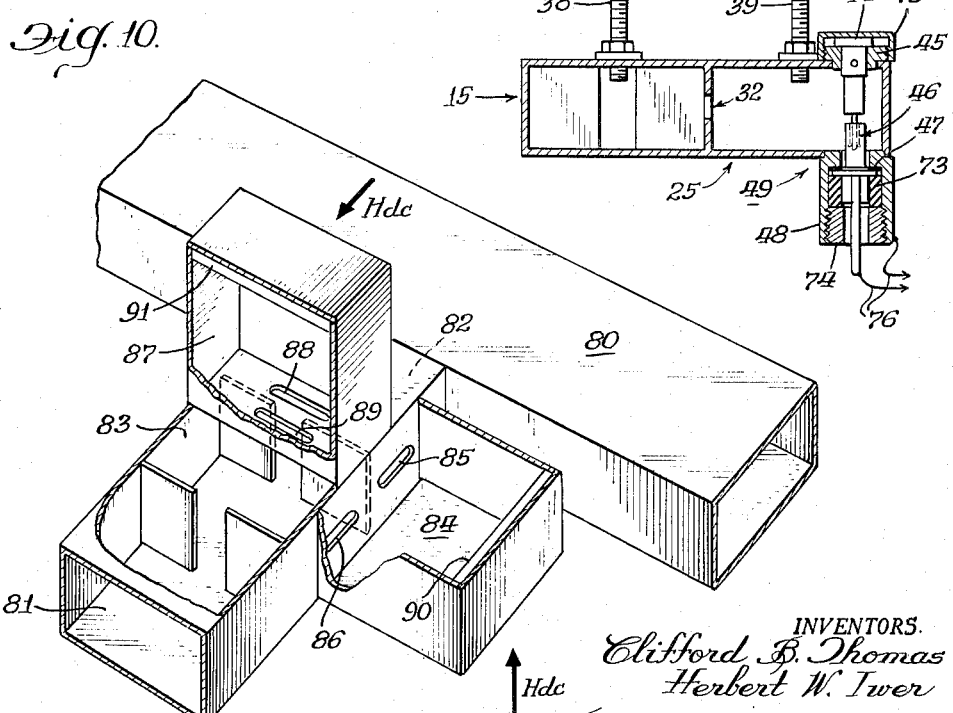

`United States Patent Office`

3,215,955
Patented Nov. 2, 1965

3,215,955
WAVEGUIDE SWITCHING BY VARIABLE TUNING OF A CAVITY WHICH SHUNTS A BAND-PASS FILTER
Clifford B. Thomas, Oak Lawn, and Herbert W. Iwer, Lombard, Ill., assignors to Motorola, Inc., Chicago, Ill., a corporation of Illinois
Continuation of abandoned application Ser. No. 206,663, July 2, 1962. This application June 1, 1964, Ser. No. 373,901
20 Claims. (Cl. 333—7)

This invention relates in general to electronic switches, and more particularly to a tunable ferrite switching device for controlling the transmission of electromagnetic waves through a waveguide transmission line. This application is a continuation of application Serial No. 206,663 filed July 2, 1962, now abandoned.

Waveguide switches utilizing ferromagnetic material are known in the art. Prior devices, however, include a ferromagnetic control element directly in the propagation path of the signal waves through the waveguide and depend upon rotation by the Faraday effect to polarize the signal waves in a desired plane. This placement of the ferromagnetic element in the waveguide structure results in a significant insertion loss while signal waves are being transmitted therethrough. Further, devices operating on the Faraday rotation principle usually provide less than optimum attenuation of signal waves through the waveguide.

In the main, all such prior waveguide switches are bulky, complex in structure, and not readily adaptable for inclusion as an integral part of the waveguide structure such that they are usually provided as separate units.

Accordingly, an object of the present invention is to provide a waveguide switch apparatus with improved attenuation characteristics and reduced insertion loss.

Another object is to provide a ferrite waveguide switch for a waveguide transmission line wherein the tunable control member is displaced from the direct signal path of the electromagnetic waves.

Still another object is to provide a waveguide switch device which is simple in mechanical and electrical design and which is readily adaptable for inclusion as an integral part of the waveguide structure.

A feature of the present invention is the provision of a ferrite waveguide switch wherein a reject cavity having a reactive control member positioned therein is coupled to a band pass filter section of waveguide apparatus through an aperture located in the common wall therebetween. The reject cavity is normally ineffective as it is resonant at a frequency outside the pass range of the band pass filter. With the application of a control signal to the reactive control member the resonant frequency of the reject cavity is brought to a value in the neighborhood of the pass band frequencies of the band pass filter cavity, thus effectively placing in shunt with the band pass filter a series resonant circuit which detunes the filter to effectively block the passage of signals therethrough.

Another feature is the provision of such a waveguide switch wherein the reactive control member is effectively displaced from the direct propagation path of the electromagnetic signals through the waveguide so as to significantly reduce insertion loss when the band pass filter is off tuned so that the signals are passed. The reactive control member may be a ferrite member with means for applying a unidirectional magnetic field therethrough, or a varactor to which a control potential is applied.

Still another feature is the provision of such a waveguide switch for coupling a plurality of units such as receivers and/or transmitters to a single waveguide with control signals being selectively applied to the reactive control members of said switches to block passage of signals therethrough.

A further feature of the invention is the provison of a plurality of filter sections in series with reject cavities coupled to the sections to provide greater attenuation than that provided by a single filter and reject cavity. Alternatively, a plurality of reject cavities can be coupled to a single band pass filter to increase the rejection effect of the band pass filter for a particular frequency.

Figure 7:
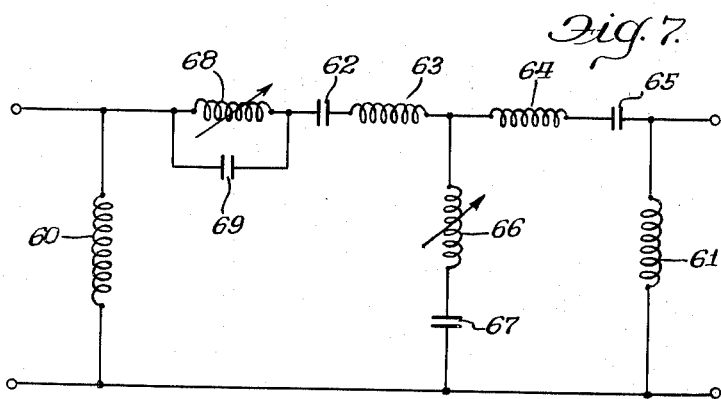
Figure 8:
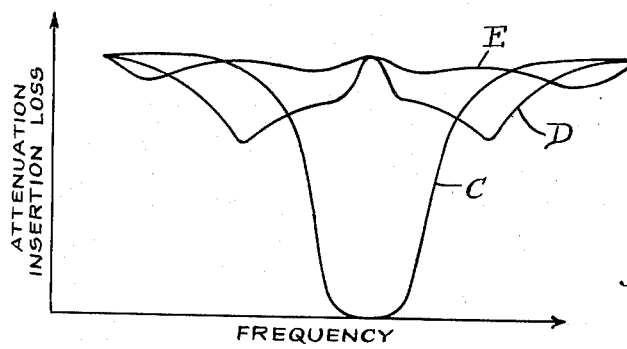

In the drawings:
FIG. 1 is a top view of a portion of a waveguide transmission line system employing the present invention;
FIG. 2 is a perspective view of the waveguide switch coupled to a band pass filter section in a waveguide;
FIG. 3 is a cross sectional view taken along lines 3—3 of FIG. 1;
FIG. 4 is a schematic representation of the band pass filter section and ferrite waveguide switch;
FIG. 5 is a representation of the response characteristics of a band pass filter section and ferrite waveguide switch;
FIG. 6 illustrates a waveguide structure, partly broken away, wherein a plurality of reject cavities are coupled to a single band pass filter;
FIG. 7 illustrates the equivalent electrical circuit of the structure of FIG. 6;
FIG. 8 shows the response characteristics of the waveguide construction of FIG. 6;
FIG. 9 illustrates a different construction wherein two reject cavities are connected to a single band pass filter;
FIG. 10 illustrates a construction wherein two band pass filter sections and two reject cavities are used, with each cavity being coupled to both filter sections; and
FIG. 11 illustrates an embodiment in which a varactor is used as the reactive control member.

In practicing the invention, waveguide switching apparatus is provided for selectively controlling the passage of electromagnetic signal waves between a waveguide transmission line and associated microwave transmitter and receiver units. Each of the waveguide switches include a reject cavity with a reactive control member positioned therein and this cavity is coupled to a band pass filter section by an aperture located in the common wall therebetween. The reject cavities are normally resonant at a frequency outside the pass range of the band pass filter sections and have no affect on the passage of signals through the band pass filter. The reactive control member is displaced from the direct path of the propagated electromagnetic signal waves so that insertion loss is effectively held to a minimum. The reactive control member may be a ferrite member, and applying an external undirectional magnetic field through the ferrite member, the resonant frequency of the reject cavtiy in which it is positioned may be increased to a value so that it is tuned to the center of the pass band of the band pass filter. Alternately the reactive control member may be a varactor to which a control potential is applied to tune the reject cavity to the pass band of the filter. The reject cavity effectively presents a series resonant tuned circuit in shunt with the band pass filter to block the passage of signals therethrough.

Waveguide switches as described may be provided in the paths from a transmission line to the associated transmitter and receiver of a system, and control signals may be applied to alternately activate the band pass filter section in such paths to selectively connect the transmitter and receiver to the transmission line. Also a plurality of band pass filter sections may be used in cascade with a reject cavity coupled to each filter section to increase both the filtering and the blocking actions. Alternately, a plurality of reject cavities can be coupled to a single band pass filter section to increase the blocking action provided thereby. It is also possible to provide a plurality of band pass filter sections in cascade with one or more reject cavities coupled to both of the adjacent band pass filter sections.

Referring to the drawings, a top view of a portion of a waveguide system 10 is shown in FIG. 1. The system is composed of hollow-type waveguide members of conductive material with a rectangular cross section as is commonly used in the transmission of transverse electromagnetic signal waves having their electrical vectors parallel to the shorter side of the rectangular cross section. The system includes a main waveguide portion 11 and branch or auxiliary waveguide arms 12 and 13. The main waveguide may be connected to an antenna (not shown) at one end and have a shorting plate 14 at the other end. Auxiliary arms 12 and 13 may be coupled to main and standby transmitters (also not shown). This is merely illustrative of the systems which might utilize the waveguide switches.

Each of the auxiliary waveguide arms 12 and 13 includes a pair of band pass filter sections as an integral part thereof. Band pass filters 15 and 16 are included in the branch arm 12 with band pass filters 17 and 18 being included in the branch arm 13. The band pass filter sections are fixed tuned to pass a given band of electromagnetic wave signals at predetermined frequencies. Phase shifters 19 and 20 are included in the main waveguide 11, with the phase shifter 20 being adjusted so that the impedance of the shorted stub from the reference line 21 to the shorting plate 14 is high, and the phase shifter 19 is adjusted so that the impedance from the reference line 22 to the shorting plate 14 is high. This results in the transmission of most of the energy from the transmitters to the antenna.

Coupled to each of the band pass filter sections to selectively control the passage of signals therethrough is a reject cavity. The reject cavity operates with the band pass filter to form what might be termed a waveguide switch. Reject cavities 25, 26, 27 and 28 are coupled individually to filter sections 15, 16, 17 and 18 respectively. Each of the reject cavities 25, 26 27 and 28 has an electromagnet assembly 30 coupled thereto, the function of which will be described subsequently.

FIG. 2 is a perspective view of waveguide arm 12 showing the filter section 15 and associated reject cavity 25 partly broken away. Filter section 15 includes reactive elements forming partial obstructions in the propagation path of the electromagnetic signal waves therethrough. The desired operating characteristics for filter 15 are obtained by placing two such transverse apertured partitions 21 and 22 at a predetermined distance apart to form a tuned chamber, at approximately a half wave length or integral multiple thereof. One such partition is formed by plates 21a and 21b, with slot 21c forming the input port. The other partition is formed by plates 22a and 22b, with slot 22c forming the output port. The characteristics of the filter are such that only a predetermined band of frequencies, represented by the letter W in FIGS. 2 and 5, will be selected.

The reject cavity 25 is adapted for mechanical affixation to the narrow or vertical side of the waveguide between the input and output ports of band pass filter section 15 with wall portion 31 common to both filter 15 and cavity 25. Rectangular aperture 32 is included in common wall 31 to couple the H field of cavity 25 to that of filter section 15.

Cavity 25 includes a tuned chamber formed by walls 31, 34, 35 and 36. A control member 33 of ferromagnetic material is positioned along the back wall 34 and opposite aperture 32 in wall 31. The length of side walls 35 and 36 of reject cavity 25 are such as to resonate the cavity below the pass range of filter section 15 so that the cavity by itself has no affect on the filter section and permits unrestricted passage of signals therethrough.

Upon application of an external, unidirectional magnetic field, represented by the arrow label H$dc$, through control member 33, the effective permeability of the same is altered to change the resonant frequency of reject cavity 25. By controlling the applied magnetic field at the proper level of intensity, the resonant frequency of reject cavity 25 can be increased to the mid-frequency of the band pass filter section 15. The reject cavity 25 will then appear as a series-resonant tuned circuit across filter 15 to prevent passage of signals therethrough.

Such action is represented schematically in FIG. 4. The equivalent lumped parameters of filter 15 are represented by elements 15a to 15f and the lumped parameters of cavity 25 are represented as elements 25a and 25b. As previously stated the cavity 25 by itself is resonant below the pass range of filter 15 and has no effect. Upon the application of the proper magnetic field through ferrite control member 33 the inductance 25a is effectively decreased and the resonant frequency of cavity 25 is increased to the center of the pass range of filter 15 as previously described. This causes the cavity 25 to short filter 15 to block the passage of signals therethrough. The cavity therefore acts as a switch to prevent the passage of signals through cavity 15.

FIG. 5 shows the response characteristic of the filter and cavity structure. The response characteristic of filter 15 when the field is not applied to the ferrite member 33 is represented by curve A in FIG. 5. This also shows the response of the circuit of FIG. 4 when the inductance 25a has the value resulting when there is no field through the ferrite member. The response characteristic of the filter when a field is applied to ferrite member 33 is represented by curve B in FIG. 5. This also represents the circuit of FIG. 4 when the inductance 25a is decreased by the field through the ferrite member 34.

FIG. 3 illustrates the method of providing and applying the magnetic field to ferrite control member 33 as well as the method of fine-tuning filter section 15 and reject cavity 25. Tuning screws 38 and 39 are provided in the upper walls of band pass filter cavity 15 and reject cavity 25 respectively. The relative position of the screw end in the respective tuned chambers determines the resonant frequency thereof and therefore functions as a variable adjustment on a vernier basis.

To provide the required magnetic field through the ferrite member 33 and electromagnet 30 is utilized having a U-shaped core 41 with the end portions positioned at the top and bottom of ferrite control member 33 in the manner shown. A coil 42 is wound around the base of core 41 with leads 43 being connected to a suitable source of control potential. By control of the current in coil 42, the field through the ferrite control member can be varied to control the tuning of cavity 25.

It is to be emphasized that ferrite control member 33 is positioned within reject cavity 25 and is therefore displaced from the direct propagation path of the electromagnetic waves through filter 15 and branch waveguide arm 13. This displacement provides an important attribute of the present invention by both increasing the attenuation characteristics of the associated band pass filter section in the no-pass condition while significantly reducing the inherent insertion loss when the associated band pass filter section is in the pass condition, as compared to systems where the ferrite material is placed directly in the band pass cavity. A study of systems where the ferrite material is placed within the band pass cavity has shown a typical insertion loss of 2 to 3 db. In the present invention, the insertion loss is less than 1.0 db with 90 db of isolation being realized between input and output ports of the associated band pass filter in the no-pass condition.

Band pass filter sections 17 and 18 in the receiver branch arm 13 and waveguide switches 27 and 28 operate in the same manner described above for filter 15 and waveguide switch 25 such that further description is deemed unnecessary. Further, the present invention is not limited to one or two band pass filter sections controlled by associated waveguide switches as shown in the transmitter and receiver branch waveguide arms. In practice, any number of such band pass filter sections may be connected in tandem for overall higher attenuation characteristics, each of which may be controlled by a waveguide switch in the manner just described. In a particular embodiment, three waveguide switches controlling three band pass filter sections has been found to provide satisfactory results in a transmitter branch arm with two of such waveguide switches controlling two band pass filter sections of a seven section band pass filter in the receiver branch arm.

In order to obtain a greater degree of rejection in a compact structure, a structure may be used wherein a plurality of reject cavities are coupled to a single band pass filter. FIG. 6 shows such a structure wherein a branch waveguide 50 is coupled to a main waveguide 51 through a band pass filter 52. Coupled to the band pass filter 52 is a first reject cavity 53 which is coupled along the narrow side of the waveguide as previously described in connection with FIG. 2. The cavity 53 is coupled to the band pass filter 52 through slot 54 which is an H-field coupling aperture having a length less than half of a free space wave length of the frequencies of interest in order to avoid resonance in the slot at such frequencies. The cavity 53 includes a ferrite member 55 to which a unidirectional magnetic field may be applied and which is supported on the end wall of the cavity opposite the slot 54. A second reject cavity 56 is coupled to the band pass filter 52 by a slot 57 which is an H-field coupling slot positioned in the broad wall of the waveguide forming the filter 52. The slot 57 is positioned as close as possible to the junction of the branch guide 50 to the main waveguide 51. The waveguide forming reject cavity 56 is positioned symmetrically with respect to the slot 57 so that a part of the cavity extends over the main waveguide 51 as indicated at 58. A ferrite member 59 is supported at the end of the cavity 56 opposite the slot 57. The unidirectional magnetic field may be applied to the ferrite member 59 simultaneously with the application of such a field to the ferrite member 55.

Considering now the operation of the waveguide structure of FIG. 6, reference is made to FIG. 7 which shows the equivalent electrical circuit. As in the structure of FIG. 2 the plates defining the slots forming the input and output of the band pass filter are represented by inductors 60 and 61 respectively. The dimensions of the waveguide forming the band pass filter may be represented as capacitor 62, inductor 63, inductor 64 and capacitor 65. As previously stated, the reject cavity coupled to the narrow wall of the waveguide forming the band pass filter may be represented as the shunt branch including inductor 66 and capacitor 67. Inductor 66 is shown to be variable to represent variation in the effective inductance as the field through the ferrite member is changed. The reject cavity coupled to the broad wall of the cavity forming the band pass filter and identified as 56 in FIG. 6 is illustrated in the schematic diagram of FIG. 7 as inductor 68 and capacitor 69. Again the inductor 68 is shown variable to represent the variation produced by the magnetic field through the ferrite member.

FIG. 8 shows the response characteristics of the filter structure shown in FIG. 6 and illustrated schematically in FIG. 7. Curve C shows the characteristic of the band pass filter when the reject filters are not tuned to the band pass frequency. This corresponds to curve A in FIG. 5. Curve D represents the attenuation characteristics of the band pass filter 52 when the reject cavity 53 is tuned to the region of the band pass filter. This shows substantial attenuation at all frequencies with the attenuation being greater at the center frequency and at widely spaced frequencies than at intermediate frequencies. Curve E showns the attenuation of the filter structure when both cavities 53 and 56 are tuned within the band pass region of the band pass filter. It will be noted that Curve E shows substantially uniform attenuation for all frequencies. The two reject cavities therefore cooperate to provide effective attenuation.

FIG. 9 shows another embodiment which is generally similar to that shown in FIG. 6 except that the reject cavity 56 in FIG. 6 is replaced by reject cavity 70 in FIG. 9. The reject cavity 70 is coupled to the band pass filter 52 by a slot 71 in the broad wall of the waveguide forming cavity 52, parallel to and closely adjacent to the common wall between the band pass filter 52 and the reject cavity 53. It is necessary that this H-field coupling slot 71 be positioned as close as possible to the cavity wall where the H-field of the microwave energy is at a maximum. The operation of the cavity 70 is substantially the same as that of cavity 56 in FIG. 6, and the operation of the structure of FIG. 9 may be represented by the equivalent electrical circuit of FIG. 7, and the response characteristics are substantially the same as represented in FIG. 8.

A still further embodiment of the microwave switch structure is shown in FIG. 10. In this structure a main waveguide 80 has a branch guide 81 coupled to the narrow wall thereof. The branch waveguide includes two band pass filters 82 and 83 arranged adjacent to each other. A first reject cavity 84 is coupled to both band pass filters 82 and 83 by slots 85 and 86 respectively. The slots are centered with respect to the common partition between the filters 82 and 83 and also with respect to the narrow wall of these band pass filters. The second reject cavity 87 is positioned across the broad wall of the waveguide forming the band pass filters 82 and 83 and is centered with respect to the partition therebetween. Coupling slots 88 and 89 provide H-field coupling to the band pass filters 82 and 83 respectively, and are located closely adjacent to the partition between the two band pass filters. The cavity 84 has a ferrite member 90 opposite slots 85 and 86 and the cavity 87 has a ferrite member 91 opposite the slots 88 and 89. Unidirectional magnetic fields are applied through the ferrite members to change the tuning of the reject cavities in the manner which has previously been explained. The attenuation produced by the filter structure of FIG. 10 is similar to that illustrated in FIG. 8, but the attenuation is somewhat greater because each of the reject cavities acts to detune two band pass filters instead of one. The effect of the two filters is additive to increase the total attenuation.

The reject cavity in the waveguide switching system can be detuned by the use of a variable capacitance as well as by a variable inductance. In such case a varactor may be used as the variable capacitance and is provided in the reject cavity instead of the ferrite member. FIG. 11 shows the same structure as FIG. 3 in which a varactor is used to change the tuning of the reject cavity 25 to alter its resonant frequency. Considering the equivalent ciricuit of FIG. 4, instead of inductor 25a being variable, the series capacitor 25b now becomes variable to change the reasonant frequency of the reject cavity.

Referring specifically to FIG. 11, the varactor 44 is shown supported in the reject cavity 25. The varactor 44 is mounted in a metallic cap bushing 45 which is secured in a wall of the cavity 25. The varactor 44 has a tip engaged by the contact of center conductor 46 of connector assembly 49. The center conductor 46 is supported by the cylindrical body 48 of connector assembly 49 and is insulated from the body 48 by insulating washer 47. The washer 47 provides a large bypass capacity between the enlarged disc of the conductor 46 and conductor body 48 at microwave frequencies so that there is no appreciable escape of microwave energy from the reject cavity 25. The center conductor 46 is held in position by insulated bushing 73 which is supported by the bushing 74 threaded into the conductor body 48. The varactor 44 may be held in bushing 45 by a threaded cap 75.

Conductors 76 are connected to the center conductor 46 and the body 48 of the connector assembly to provide a direct current potential across varactor 44. The effective capacitance of the varactor reduces as the biasing voltage applied is increased, and this acts to increase the resonant frequency of the reject cavity 25. The cavity 25 can be normally detuned so that it has no effect on the band pass filter 15, with the voltage applied to the varactor increasing the resonant frequency of the reject cavity so that it comes within the pass band of the filter cavity 15. The reject cavity 25 in such case shunts the filter cavity 15 so that it presents a low impedance at the center of the band pass filter cavity and effectively blocks the passage of waves therethrough. Alternatively, the reject cavity can be designed to be resonant within the band pass frequencies of the filter cavity 15 to block the passage of waves therethrough. By applying a voltage to the varactor the resonant frequency of the reject cavity is increased so that it has no effect on the band pass filter cavity 15 and allows waves to pass therethrough.

In the foregoing description, it has been stated that the reject cavities are normally tuned to a frequency outside the pass band of the associated band pass filter and the magnetic field applied to the ferrite member in the cavity changes the tuning so that the cavity is resonant within the band pass range of the filter. However, it may be preferable in some applications to design the cavity so that it is tuned to the frequency of the band pass filter when no field is applied to the ferrite. In such case the cavity will normally act as a reject cavity. Then by applying a unidirectional magnetic field to the ferite loaded reject cavity, its resonant frequency is shifted sufficiently above the pass band frequencies of the band pass cavity such that it has very little effect on the band pass response of the band pass filter cavity in the frequency range of interest.

As previously stated, applying a magnetic field to the ferrite member in the direction shown in FIG. 2 will cause the resonant frequency of the cavity to increase. It is also possible to rotate the magnetic field by 90 degrees, that is so that the magnetic field would be in the direction of the longer dimension of the ferrite member. In such case the magnetic field will act to reduce the frequency of the cavity.

The invention therefore provides a waveguide switch device of simple electrical and mechanical design which has improved operating characteristics with respect to attenuation and inherent insertion loss.

We claim:

1. High frequency wave transmission apparatus including in combination, a waveguide for passing signals therethrough and having a band pass filter section with input and output ports, a tunable reject cavity coupled to said band pass filter section, said reject cavity and filter section having a common wall therebetween with an aperture therein, a reactive control member having a reactance which varies in response to a control signal aplied thereto positioned within said cavity along the side opposite said aperture, and means for applying a control signal to said control member, said reject cavity being tunable by said reactive control member through a range of frequencies including frequencies in the pass band range of said band pass filter section and frequencies differing from the frequencies of the pass band range of said band pass filter section, said control member operating in response to a control signal to control the tuning of said reject cavity, whereby said cavity is tunable to a frequency which effectively shunts the band pass filter section and impedes the passage of signals therethrough.

2. High frequency wave transmission apparatus including in combination, a waveguide for passing signals therethrough and having a band pass filter section therein with input and output ports, a tunable reject cavity connected to said band pass filter section, said reject cavity and said filter section having a common wall therebetween with an aperture therein, reactive control means having a reactance which varies in response to a control signal applied thereto positioned within said cavity along the side opposite said aperture, and means for applying a control signal to said reactive control means for altering the reactance of the same to change the resonant frequency of said reject cavity, said cavity being rendered resonant at a frequency within the pass band range of said filter section to shunt the band pass filter and impede the passage of signals therethrough and being rendered resonant at a frequency differing substantially from the pass band range of said filter section so that said cavity has negligible effect on said band pass filter section in response to the control signal applied to said reactive control means.

3. A waveguide switch device for controlling signals of a given frequency through a rectangular waveguide apparatus having a fixed tuned band pass filter section, and wherein such band pass filter section includes a first input port and a second output port, said switch device including in combination, means forming a reject cavity, said reject cavity being adapted for mechanical attachment to one side of the waveguide between the input and output ports of the band pass filter section, said filter section and said cavity having a common wall therebetween with an aperture therein, said aperture coupling the H-field of said cavity to the band pass filter section, a reactive control member having a reactance which varies in response to a control signal applied thereto positioned within said cavity adjacent the wall thereof opposite said aperture, said reject cavity being normally resonant at a frequency which differs from the pass range of the band pass filter section, and means for applying a control signal to said control member to change the effective reactance thereof and change the resonant frequency of said reject cavity to the pass range of the band pass filter section, whereby said cavity shunts the filter section to present a high impedance between the input and output ports thereof, said reactive control member introducing negligible insertion loss when said cavity is resonant at its normal frequency.

4. A ferrite waveguide switch device for controlling signals of a given frequency through a waveguide apparatus having a fixed tuned band pass filter section, and wherein such band pass filter section includes a first input port and a second output port, said switch device including in combination, means forming a reject cavity, said reject cavity being adapted for mechanical attachment to one side of the waveguide between the input and output ports of the band pass filter section and having a common wall therebetween with an aperture therein, said aperture coupling the H-field of said cavity to the band pass filter section, a control member of ferrite magnetic material positioned with said cavity on the wall opposite said aperture, said reject cavity being normally resonant at a frequency below the pass range of the band pass filter section, electromagnet means for applying a unidirectional magnetic field through said magnetic member, said electromagnet means including a U-shaped core having end portions positioned adjacent said magnetic control member and coil means thereon, and means for controlling the current through said coil means to apply said unidirectional magnetic field to said ferromagnetic control member to change the effective permeability thereof and increase the resonant frequency of said reject cavity to the pass range of the band pass filter section, said cavity introducing negligible insertion loss through the band pass filter section when resonant at said frequency below the range of said filter section and presenting substantial impedance between the input and output ports when tuned to the pass range of said filter section.

5. High frequency wave transmission apparatus including in combination, a waveguide for passing signals therethrough and having a narrow side and a broad side, said waveguide including therein a band pass filter section with input and output ports, a first reject cavity coupled to the narrow side of said waveguide, said first reject cavity and said filter section having a common wall therebetween with an aperture therein, a second reject cavity coupled to the broad side of said waveguide, said second reject cavity and said filter section having a common wall therebetween with an aperture therein, reactive control means having a reactance which varies in response to a control signal applied thereto positioned within each of said cavities, and means for applying a control signal to said control means, said reject cavities being normally resonant at a frequency differing from the frequencies in the pass band range of said band pass filter section, said signals applied to said control means altering the effective reactance of the same to change the resonant frequencies of said reject cavities to frequencies within the pass band range of said filter section, whereby said cavities are tuned to shunt said band pass filter section and impede the passage of signals therethrough.

6. High frequency wave transmission apparatus including in combination, a waveguide for passing signals therethrough and having a narrow side and a broad side, said waveguide including therein a band pass filter section with input and output ports, a first reject cavity coupled to the narrow side of said waveguide, said first reject cavity and said filter section having a common wall therebetween with an aperture therein, a second reject cavity coupled to the broad side of said waveguide, said second reject cavity and said filter section having a common wall therebetween with an aperture therein, a control member of ferrite material positioned within each of said cavities, and means for applying unidirectional magnetic fields through said ferrite members, said magnetic fields through said ferrite members altering the effective permeability of the same to change the resonant frequencies of said reject cavities, whereby said cavities can be rendered resonant at frequencies within the band passed by said filter section to shunt said band pass filter section and impede the passage of signals therethrough, and said cavities can be rendered resonant at frequencies differing from the frequencies within the band passed by said filter section so that said cavities have negligible effect on said band pass filter section.

7. High frequency wave transmission apparatus including in combination, a waveguide for passing signals therethrough and having a narrow side and a broad side, said waveguide including therein a band pass filter section with input and output ports, a first reject cavity coupled to the narrow side of said waveguide, said first reject cavity and said filter section having a common wall therebetween with a first elongated aperture therein, said first aperture being elongated in the direction from said input port to said output port and being substantially centered with respect to the width of said narrow side of said waveguide, a second reject cavity coupled to the broad side of said waveguide, said second reject cavity and said filter section having a common wall therebetween with a second elongated aperture therein, said second aperture being adjacent said input port and said second reject cavity being positioned symmetrically with respect to said second aperture, a reactive control member positioned within each of said cavities along the side thereof opposite said aperture, and means for applying control signals to said control members, said control signals altering the effective reactance of the said control members to change the resonant frequencies of said reject cavities, said cavities being rendered resonant at frequencies within the band passed by said filter section to shunt said band pass filter section and impede the passage of signals therethrough and being rendered resonant at frequencies differing from the frequencies within the band passed by said filter section so that said cavities have neglible effect on said band pass filter section in response to said control signals.

8. High frequency wave transmission apparatus including in combination, a waveguide for passing signals therethrough and having a narrow side and a broad side, said waveguide including therein a band pass filter section with input and output ports, the first reject cavity connected to the narrow side of said waveguide, said first reject cavity and said filter section having a common wall therebetween with a first elongated aperture therein, said first aperture being elongated in the direction between said input and output ports and being substantially centered across the width of said narrow side of said waveguide, a second reject cavity connected to the broad side of said waveguide, said second reject cavity and said filter section having a common wall therebetween with a second elongated aperture therein, said second elongated aperture being adjacent to and parallel to said common wall between said filter section and said first reject cavity, said second reject cavity being positioned symmetrically with respect to said second aperture, a control member of ferrite material positioned within each of said cavities along the side thereof opposite said aperture, and means for applying unidirectional magnetic fields through said ferrite members, and magnetic fields through said ferrite members altering the effective permeability of the same to change the resonant frequencies of said reject cavities, whereby said cavities can be rendered resonant at frequencies within the pass band of said filter section to shunt said band pass filter section and impede the passage of signals therethrough, and said cavities can be rendered resonant at frequencies differing from the frequencies within the pass band by said filter section so that said cavities have negligible effect on said band pass filter section.

9. High frequency wave transmission apparatus including in combination, a waveguide for passing signals therethrough and having a narrow side and a broad side, said waveguide including therein first and second adjacent band pass filter sections each passing the same band of frequencies, a first reject cavity coupled to the narrow side of said waveguide, said first reject cavity having a common wall with said first and second filter sections with apertures therein extending between said cavity and each filter section, a second reject cavity coupled to the broad side of said waveguide, said second reject cavity having a common wall with said first and second filter sections with apertures therein extending between said second cavity and each filter section, reactive control means having a reactance which varies in response to a control signal applied thereto positioned within each of said cavities along the side thereof opposite said apertures, and means for applying control signals to each of said control means, said control signals changing the effective reactance of said control means to change the resonant frequencies of said reject cavities, said cavities being rendered resonant at frequencies within the band passed by said filter sections to shunt said band pass filter sections and impede the passage of signals therethrough and being rendered resonant at frequencies differing from the frequencies within the band passed by said filter sections so that said cavities have negligible effect on said band pass filter sections in response to said control signals.

10. High frequency wave transmission apparatus including in combination, a waveguide for passing signals therethrough and having a narrow side and a broad side, said waveguide including therein first and second adjacent band pass filter sections each passing the same band of frequencies, partition means separating said first and second filter sections and having an aperture therein forming the output port of said first filter section and the input port of said second filter section, a first reject cavity connected to the narrow side of said waveguide and positioned symmetrically with respect to said partition means, said first reject cavity having a common wall with said first and second filter sections with first and second apertures therein extending between said cavity and said first and second filter sections respectively, a second reject cavity connected to the broad side of said waveguide and positioned symmetrically with respect to said partition means, said second reject cavity having a common wall with said first and second filter sections with first and second apertures therein extending between said second cavity and said first and second filter sections respectively, a reactive control member positioned within each of said cavities, and means for applying control signals to said reactive control members, said reject cavities being constructed to be resonant at a frequency differing from the frequencies in the band passed by said band pass filter sections, said control signals altering the effective permeability of said reactive control members to change the resonant frequencies of said reject cavities so that said cavities are resonant at frequencies within the band passed by said filter sections, whereby said cavities are tuned to shunt said band pass filter sections and impede the passage of signals therethrough.

11. In microwave apparatus including first and second units which are coupled to a main waveguide through first and second auxiliary waveguide arms each having a band pass filter section, waveguide switching apparatus for selectively controlling the passage of signals between the first and second units and said waveguide through said band pass filter sections, said switching apparatus including in combination, means forming a first reject cavity, means for coupling said first cavity to the band pass filter section of the first waveguide arm and forming a common wall therebetween having an aperture therein, means forming a second reject cavity, means for coupling said second cavity forming means to the band pass filter section of the second waveguide arm and forming a common wall therebetween having an aperture therein, said reject cavities each having electrically tunable reactive control means positioned therein, said reject cavities being normally resonant at frequencies below the pass band ranges of the band pass filter sections, means for selectively applying a control signal to said reactive control means to alter the effective reactance of the same and increase the resonant frequencies of said reject cavities respectively to the pass range of the associated band pass filter sections, whereby each of said cavities shunts the associated band pass filter section and impedes the passage of signals therethrough.

12. In microwave apparatus including a plurality of units each of which is coupled to a main waveguide through an associated auxiliary waveguide arm having a plurality of band pass filter sections in tandem therein, waveguide switching apparatus for selectively controlling the passage of signals through the band pass filter sections including in combination, means forming a plurality of reject cavities each of which is coupled to one of the band pass filter sections and having a common wall therebetween with a rectangular aperture located therein, said reject cavities each having electrically tunable reactive control means positioned therein on the wall opposite said aperture, said reject cavities each being normally resonant at a frequency below the pass band range of the associated band pass filter section, means for selectively applying a control signal to each of said reactive control means to alter the effective reactance of the same and increase the resonant frequency of the associated reject cavity to the pass range of the associated band pass filter section, whereby each of said cavities shunts the associated band pass filter section and impedes the passage of signals therethrough.

13. High frequency wave transmission apparatus including in combination, a waveguide for passing signals therethrough and having a band pass filter section therein with input and output ports, a tunable reject cavity connected to said band pass filter section, said reject cavity and said filter section having a common wall therebetween with an aperture therein, a control member of ferromagnetic material positioned within said cavity along the side opposite said aperture, and means for applying a unidirectional magnetic field through said ferromagnetic member, said magnetic field through said ferromagnetic member altering the effective permeability of the same to change the resonant frequency of said reject cavity, said cavity being rendered resonant at a frequency within the pass band range of said filter section to shunt the band pass filter section and impede the passage of signals therethrough and being rendered resonant at a frequency differing substantially from the pass band range of said filter section so that said cavity has negligible effect on said band pass filter section in response to the magnetic field applied to said ferromagnetic member.

14. High frequency wave transmission apparatus including in combination, a waveguide for passing signals therethrough and having a narrow side and a broad side, said waveguide including therein first and second adjacent band pass filter sections each passing the same band of frequencies, partition means separating said first and second filter sections and having an aperture therein forming the output port of said first filter section and the input port of said second filter section, a first reject cavity connected to the narrow side of said waveguide and positioned symmetrically with respect to said partition means, said first reject cavity having a common wall with said first and second filter sections with first and second apertures therein extending between said cavity and said first and second filter sections respectively, a second reject cavity connected to the broad side of said waveguide and positioned symmetrically with respect to said partition means, said second reject cavity having a common wall with said first and second filter sections with first and second apertures therein extending between said second cavity and said first and second filter sections respectively, a control member of ferrite material positioned within each of said cavities along the side thereof opposite said apertures, and means for applying unidirectional magnetic fields through said ferrite members, said reject cavities being constructed to be resonant at a frequency differing from the frequencies in the band passed by said band pass filter sections, said magnetic fields through said ferrite members altering the effective permeability of the same to change the resonant frequencies of said reject cavities so that said cavities are resonant at frequencies within the band passed by said filter sections, whereby said cavities are tuned to shunt said band pass filter sections and impede the passage of signals therethrough.

15. High frequency wave transmission apparatus including in combination, a waveguide for passing signals therethrough and having a band pass filter section therein with input and output ports, a tunable reject cavity connected to said band pass filter section, said reject cavity and said filter section having a common wall therebetween with an aperture therein, a varactor control member positioned within said cavity, and means for applying a unidirectional control potential to said varactor member for altering the effective reactance of the same to change the resonant frequency of said reject cavity, said cavity being rendered resonant at a frequency within the pass band range of said filter section to shunt the band pass filter and impede the passage of signals therethrough, and being rendered resonant at a frequency differing substantially from the pass band range of said filter section so that said cavity has negligible effect on said band pass filter section in response to the control potential applied to said varactor member.

16. A waveguide switch device for controlling signals of a given frequency through a rectangular waveguide apparatus having a fixed tuned band pass filter section, and wherein such band pass filter section includes a first input port and a second output port, said switch device including in combination, means forming a reject cavity, said reject cavity being adapted for mechanical attachment to one side of the waveguide between the input and output ports of the band pass filter section, said filter section and said cavity having a common wall therebetween with an aperture therein, said aperture coupling the H- field of said cavity to the band pass filter section, a varactor control member positioned within said cavity adjacent the wall thereof opposite said aperture, said reject cavity being normally resonant at a frequency which differs from the pass range of the band pass filter section, and means for applying a unidirectional potential to said varactor member to change the effective reactance thereof and change the resonant frequency of said reject cavity to the pass range of the band pass filter section, whereby said cavity shunts the filter section to present a high impedance between the input and output ports thereof, said varactor introducing negligible insertion loss when said cavity is resonant at its normal frequency.

17. High frequency wave transmission apparatus including in combination, a waveguide for passing signals therethrough and having a band pass filter section with input and output ports, a tunable reject cavity coupled to said band pass filter section, said reject cavity and said filter section having a common wall therebetween with an aperture therein, reactive control means having a reactance which varies in response to a control signal applied thereto positioned within said cavity, and means for applying a control signal to said control means, said reject cavity being tunable by said reactive control means through a range of frequencies including frequencies in the pass band range of said band pass filter section and frequencies differing from the frequencies of the pass band range of said band pass filter section, said control means operating in response to a control signal to control the tuning of said reject cavity, whereby said cavity is tunable to a frequency which effectively shunts the band pass filter section and impedes the passage of signals therethrough.

18. High frequency wave transmission apparatus including in combination, a waveguide for passing signals therethrough and having a band pass filter section therein with input and output ports, a tunable reject cavity connected to said band pass filter section, said reject cavity and said filter section having a common wall therebetween with an aperture therein, electrically controlled tuning means within said cavity, and means for applying a control signal to said tuning means for altering the resonant frequency of said reject cavity, said cavity being rendered resonant at a frequency within the pass band range of said filter section to shunt the band pass filter section and impede the passage of signals therethrough, and said cavity being rendered resonant at a frequency differing substantially from the pass band range of said filter section so that said cavity has negligible effect on said band pass filter section, with the action of said cavity on said filter section being controlled by the control signal applied to said tuning means.

19. A waveguide switch device for controlling the transmission of signals through rectangular waveguide apparatus having a fixed tuned band pass filter section, said switch device including in combination, means forming a tunable reject cavity, said reject cavity being adapted to be positioned at one side of the waveguide adjacent the band pass filter section, said reject cavity and the filter section having a common wall therebetween with an aperture therein, said aperture coupling the H-field of said cavity to the band pass filter, electrically controlled tuning means within said cavity, and means for applying a control signal to said tuning means for altering the resonant frequency of said reject cavity, said cavity being selectively rendered resonant at a frequency within the pass band range of the filter section to shunt the band pass filter section and impede the passage of signals therethrough, and being selectively rendered resonant at a frequency differing from the pass band range of the filter section so that said cavity has negligible effect on the response of the band pass filter section.

20. High frequency wave transmission apparatus including in combination, a waveguide for passing signals therethrough and having a band pass filter section therein with input and output ports, a tunable reject cavity connected to said band pass filter section, said reject cavity and said filter section having a common wall therebetween with an aperture therein, voltage responsive tuning means within said cavity, and means for applying a control voltage to said tuning means for altering the resonant frequency of said reject cavity, said cavity being selectively rendered resonant at a frequency within the pass band range of said filter section to shunt the band pass filter section and impede the passage of signals therethrough and being selectively rendered resonant at a frequency differing substantially from the pass band range of said filter section so that said cavity has negligible effect on said band pass filter section in response to the control voltage applied to said tuning means.

References Cited by the Examiner

UNITED STATES PATENTS

| 2,396,044 | 3/46 | Fox | 333—7 |
| 3,113,278 | 12/63 | Okwit | 333—24.2 |

OTHER REFERENCES

Fay, "Ferrite-Tuned Resonant Cavities," Proceedings of I.R.E., vol. 44, No. 10, October 1956, pp. 1446–1449.

HERMAN KARL SAALBACH, *Primary Examiner.*